A. T. BROWN.
MOTOR AGRICULTURAL MACHINE.
APPLICATION FILED SEPT. 22, 1911.
1,193,505.
Patented Aug. 8, 1916.
8 SHEETS—SHEET 3.
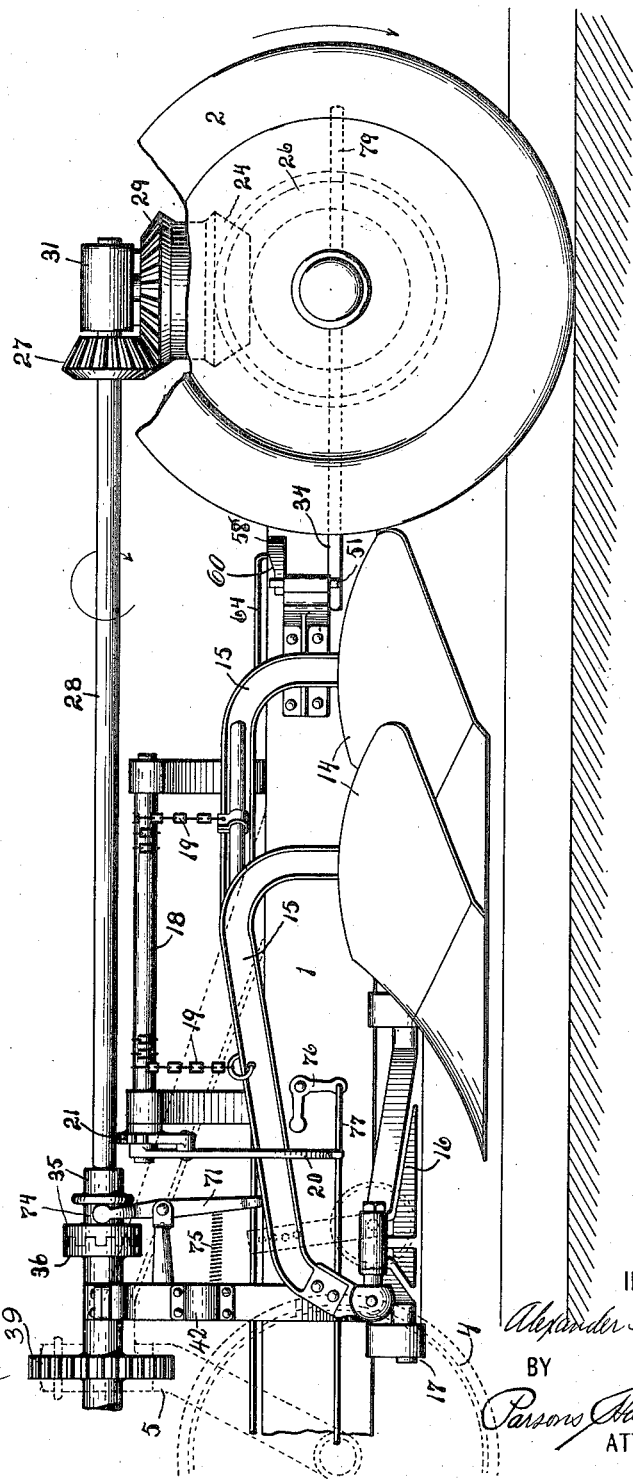
WITNESSES:
INVENTOR
Alexander T. Brown
BY
Parsons Hall & Bodell
ATTORNEYS

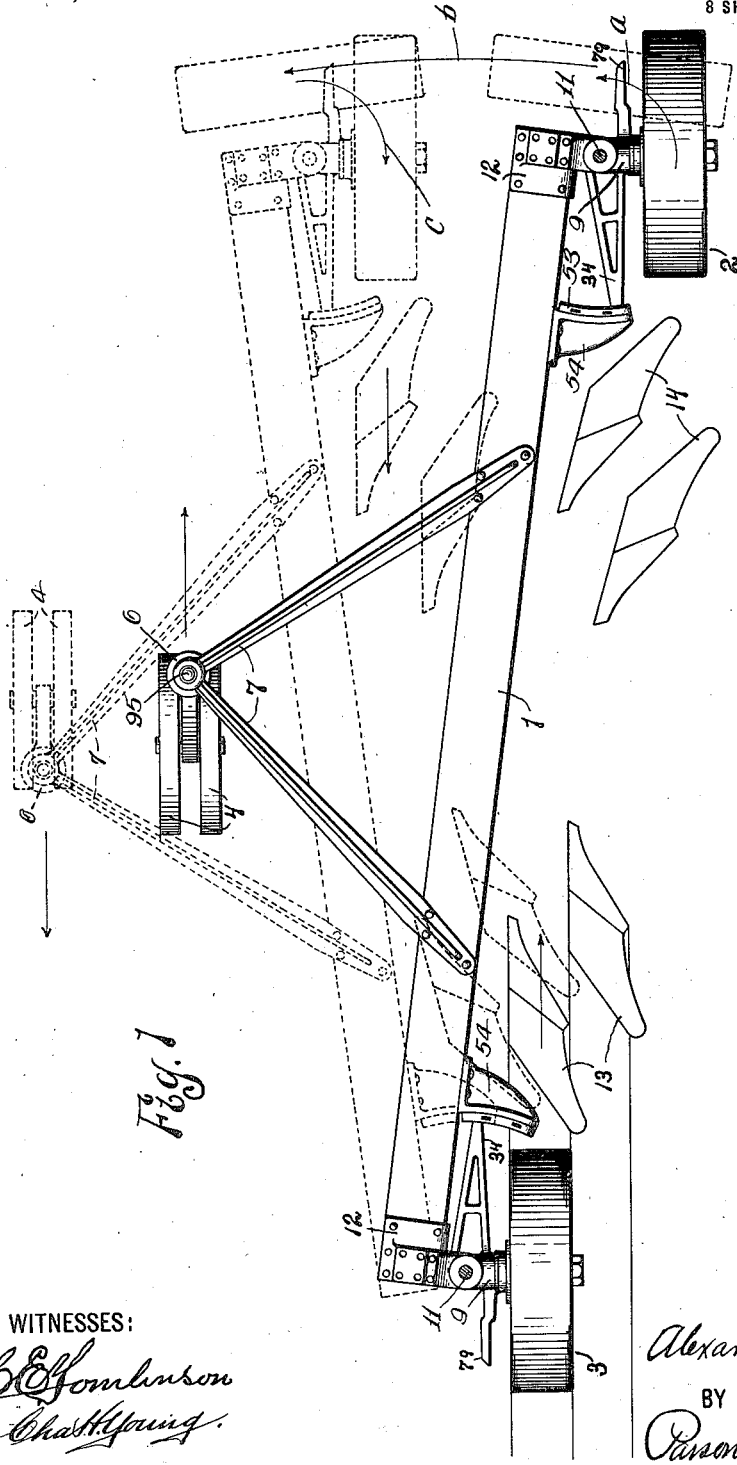

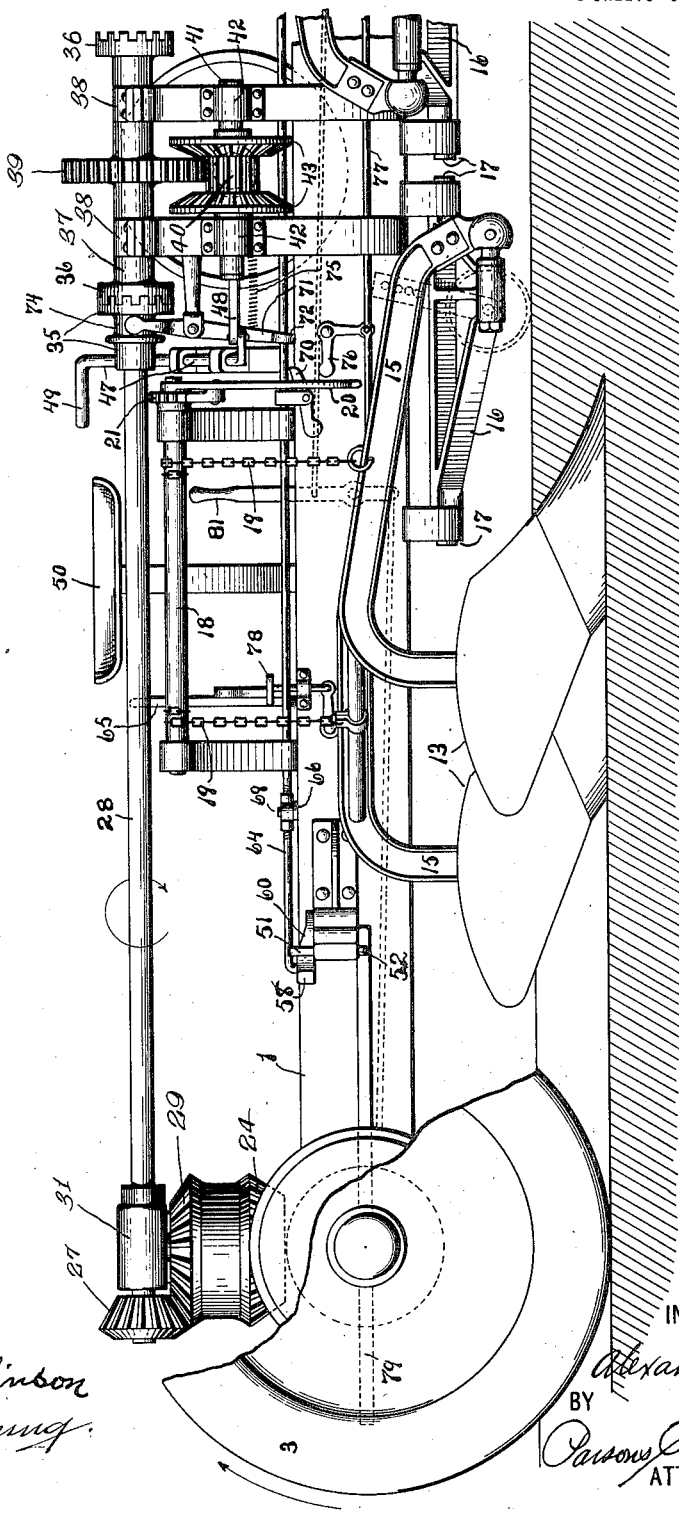

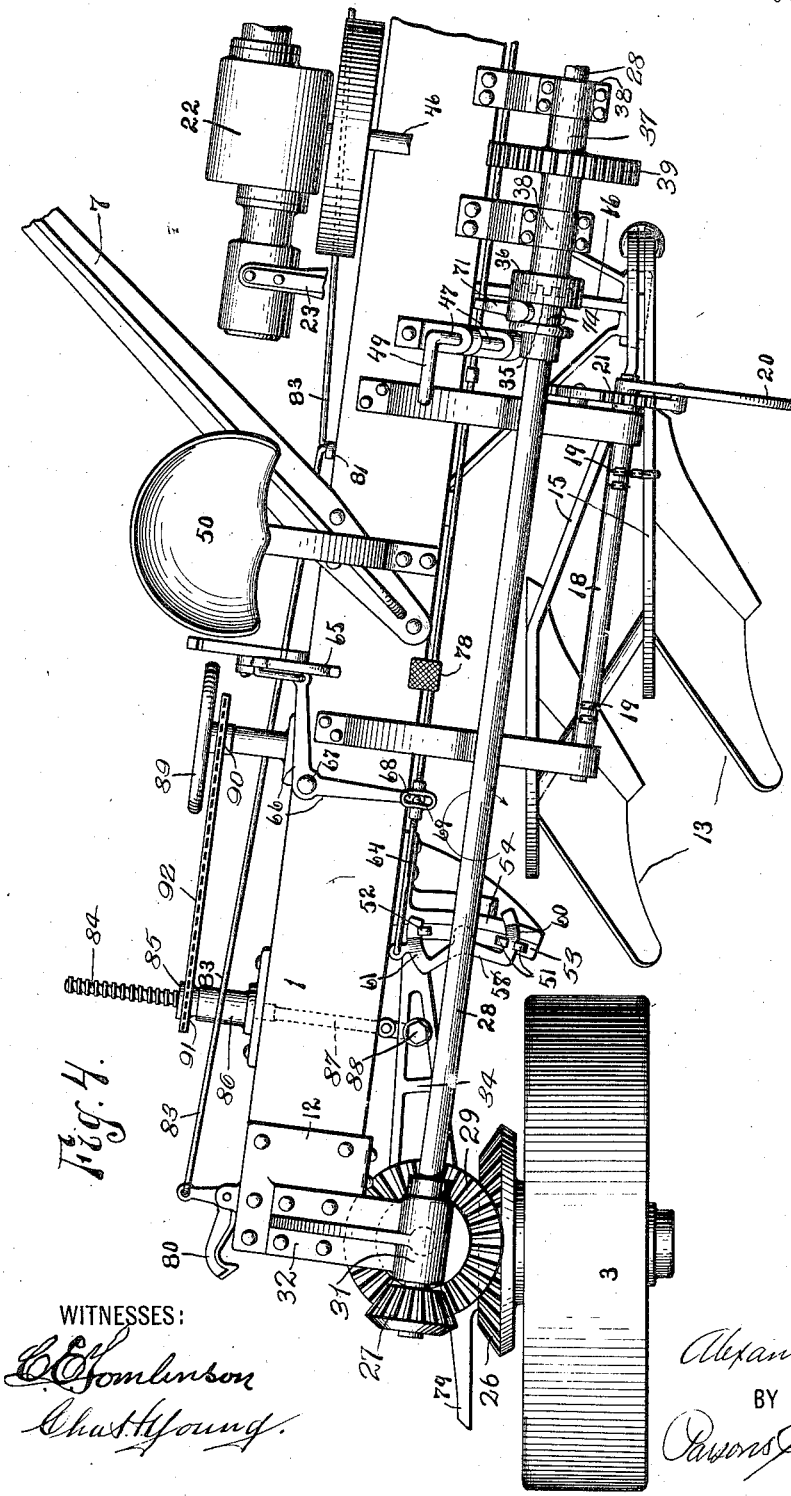

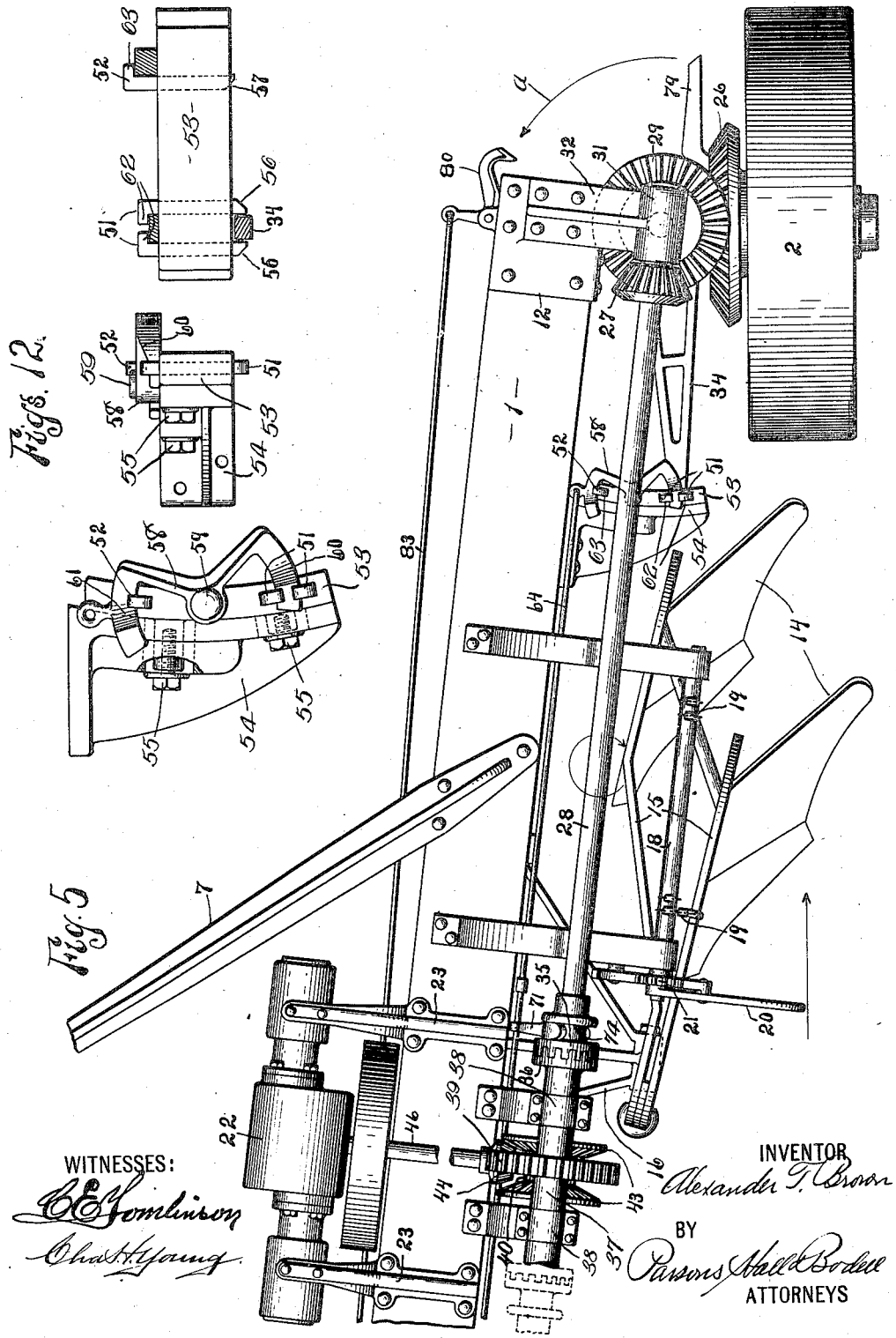

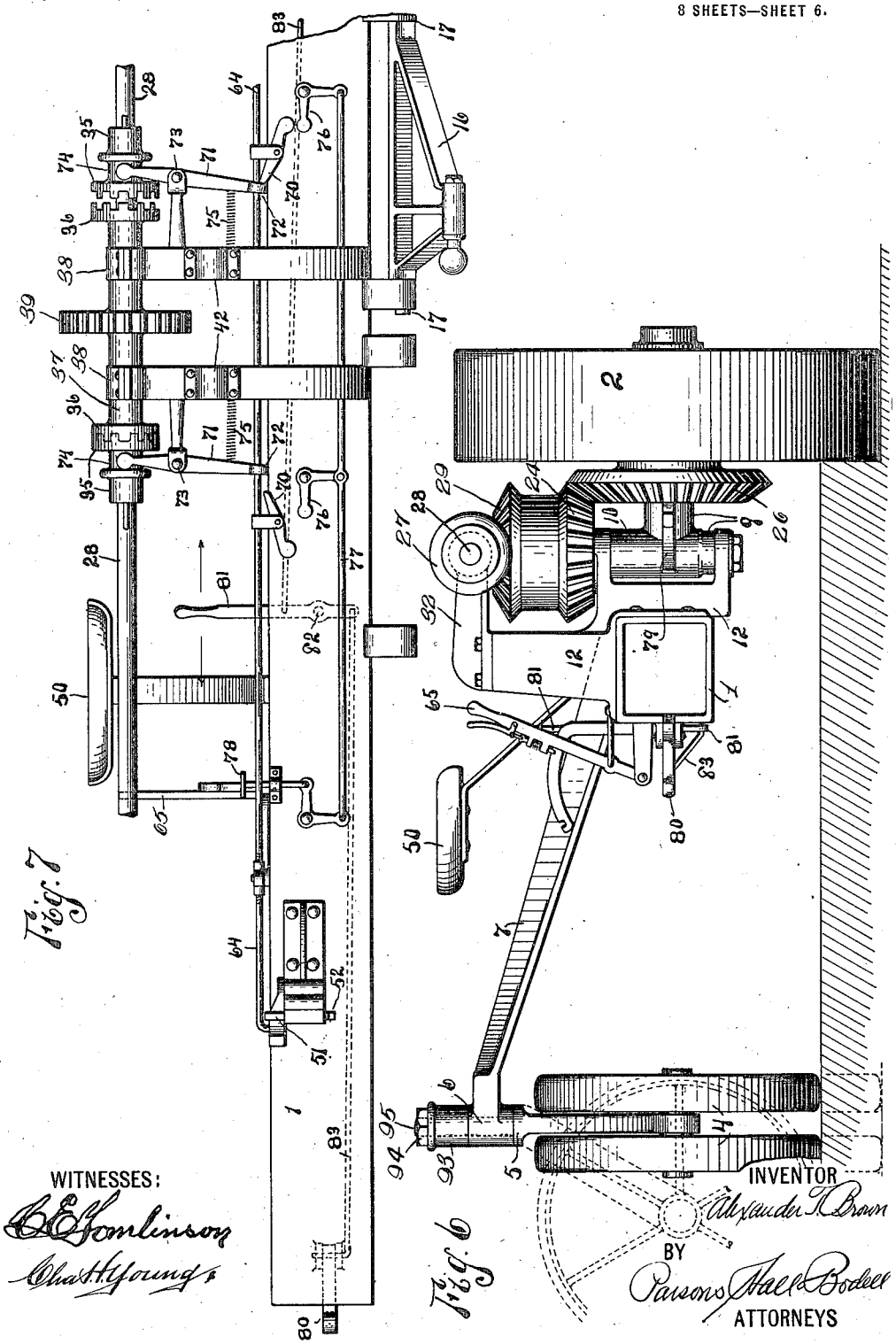

A. T. BROWN.
MOTOR AGRICULTURAL MACHINE.
APPLICATION FILED SEPT. 22, 1911.
1,193,505.
Patented Aug. 8, 1916.
8 SHEETS—SHEET 7.
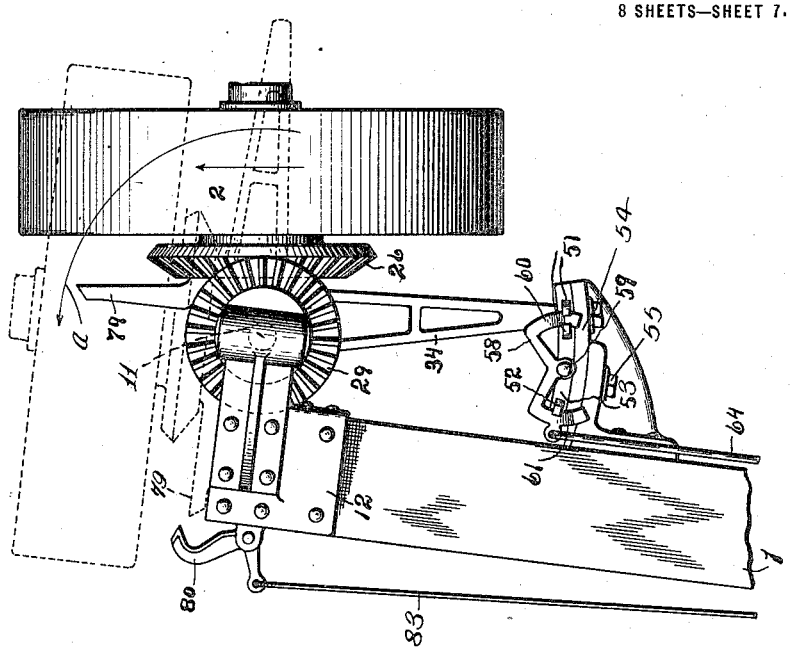
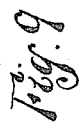
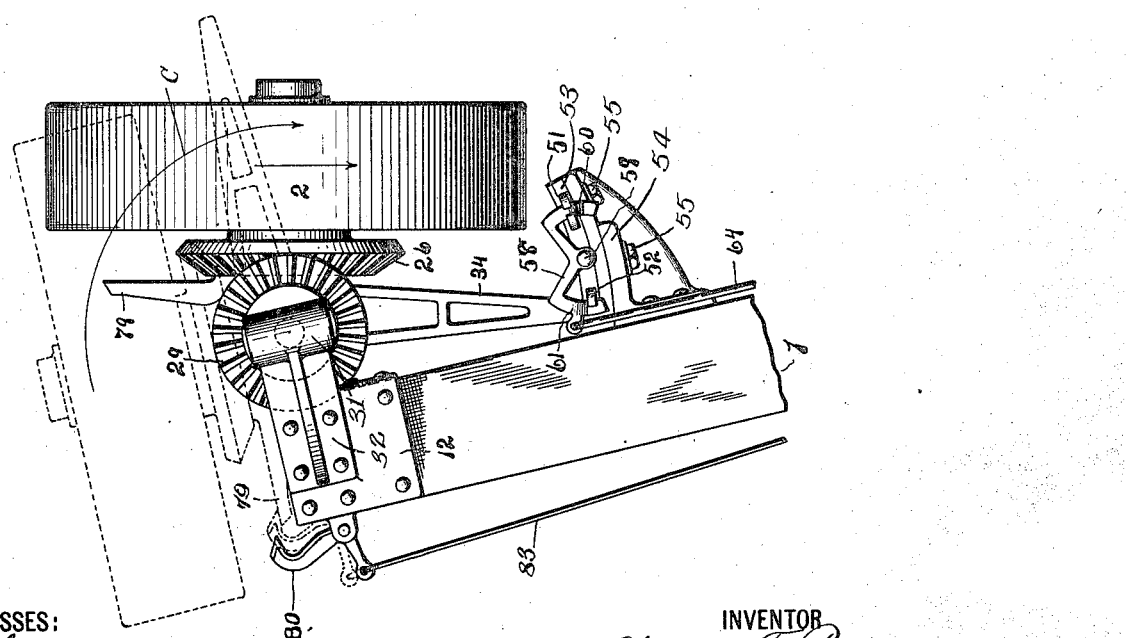
WITNESSES:
INVENTOR
Alexander T. Brown
BY
Parsons Hall Bodell
ATTORNEYS A. T. BROWN.
MOTOR AGRICULTURAL MACHINE.
APPLICATION FILED SEPT. 22, 1911.
1,193,505.
Patented Aug. 8, 1916.
8 SHEETS—SHEET 8.
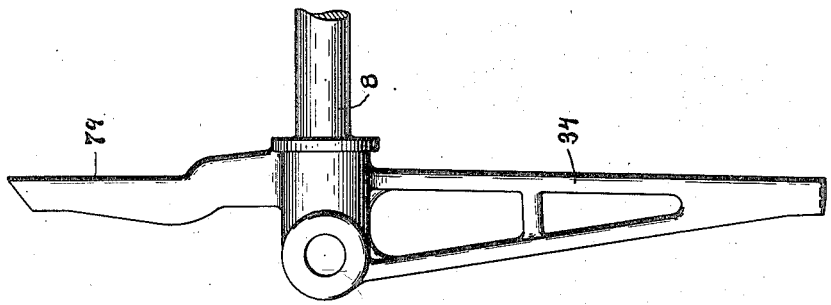
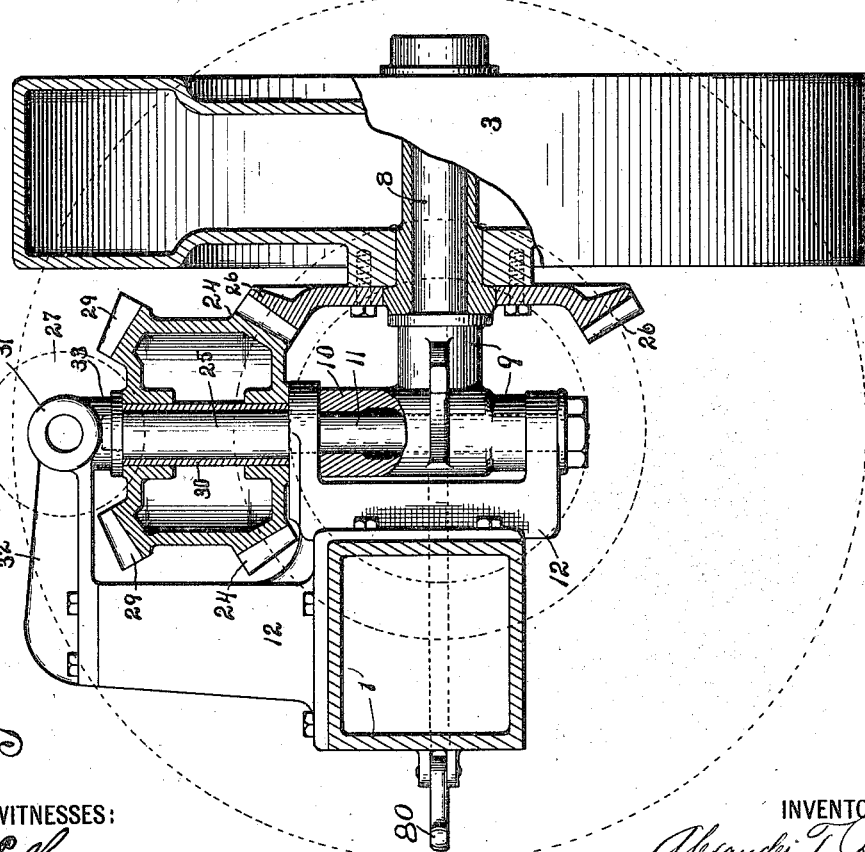
WITNESSES:
INVENTOR
Alexander T. Brown
BY
Parsons Hall & Bodell
ATTORNEYS

UNITED STATES PATENT OFFICE.

ALEXANDER T. BROWN, OF SYRACUSE, NEW YORK.

MOTOR AGRICULTURAL MACHINE.

1,193,505.   Specification of Letters Patent.   Patented Aug. 8, 1916.

Application filed September 22, 1911. Serial No. 650,753.

*To all whom it may concern:*

Be it known that I, ALEXANDER T. BROWN, of Syracuse, in the county of Onondaga, in the State of New York, have invented a certain new and useful Motor Agricultural Machine, of which the following is a specification.

This invention has for its object the production of a self propelled or motor agricultural machine which is particularly simple in construction and operation, and highly efficient and durable in use; and it consists in the combinations and constructions hereinafter set forth and claimed.

In describing this invention reference is had to the accompanying drawing in which like characters designate corresponding parts in all the views.

Figure 1 is a plan of an agricultural machine embodying one form of my invention, parts being omitted. Figs. 2 and 3 are elevations of opposite end portions of this machine, the farming implements in Fig. 2 being shown in operative position and the implements in Fig. 3 being shown as out of operative position. Figs. 4 and 5 are plan views of parts seen in Figs. 2 and 3. Fig. 6 is an end elevation of said machine, parts being omitted. Fig. 7 is a fragmentary view illustrating the intermediate portion of the machine and the operating or controlling parts connected thereto. Figs. 8 and 9 are fragmentary views illustrating the operations of the tractors, the position of the leading tractor being shown in Fig. 8 and the position of the following tractor being shown in Fig. 9. Fig. 10 is a vertical sectional view, partly in elevation, through one of the tractors and contiguous parts. Fig. 11 is a detail view of the axle support of the tractor. Fig. 12 illustrates the locking means for each axle support in plan, and end and front elevations.

This self propelled agricultural machine comprises, generally, a frame, a farming implement carried by the frame, means for swinging either end of the frame relatively to the other end thereof in order to position the machine in operative relation to the work to be performed thereby. For instance, in the machine illustrated, opposite ends of the frame are alternately shiftable laterally, one end being shiftable at one end of a row or furrow and the other at the other end of a row or furrow, so that the machine progresses crosswise of the field, or in a direction at a right angle to the travel of the machine, by alternately advancing one end of the frame ahead of the other at the end of the rows or furrows.

In the illustrated embodiment of my invention I have shown the implements carried thereby as furrow turning elements or plows. Any other farming implements may, however, be used or connected with my machine.

The exemplification of the machine illustrated in the drawings comprises a frame, tractors supporting the frame and spaced apart in a direction lengthwise thereof, the tractors being preferably located near opposite ends of the frame and pivotally connected thereto and arranged with their pivotal axes extending substantially vertical, reversible farming implements carried by the frame, a motor, power-transmitting connections operated by the motor for swinging the tractor at either end of the frame about its upright axis, and actuating such tractor after it has been turned a predetermined degree and thereby swinging the corresponding end of the frame laterally about the axis of the pivotal connection at the other end of the frame, and means for controlling the operations of such power-transmitting connections by the motor.

The frame 1 may be of any desirable form, size and construction and is here shown as a hollow metal beam. The tractors 2 and 3 are located at the front and rear ends of the frame or beam 1, and in the normal use of the machine, the beam is inclined relatively to the line of travel of the machine and the tractors travel in different paths. A caster wheel 4 is arranged at one side of the intermediate portion of the frame, said caster wheel being of any desirable form, size and construction and having its supporting bracket 5 journaled in a bearing 6 carried at the outer end of laterally extending frame members 7.

Each of the tractors 2, 3 is here shown as mounted on a stud axle 8, Figs. 10 and 11, which is carried by a suitable support 9 provided with an upright sleeve 10 rotatably mounted on a spindle 11 supported in the arms of a bracket or yoke 12 fixed to the beam or frame 1 near each end of the frame.

The upper and lower ends of the sleeve 10 abut against opposing faces of the arms of the yoke 12; and the axle support 9, spindle 11 and yoke 12 resemble somewhat in appearance the steering knuckle of an ordinary motor vehicle. The farming implements are in this embodiment of my invention shown as gangs of plows 13, 14 arranged reversely with respect to each other, the plows of each gang having the front ends of their beams 15 pivotally connected to a bracket 16 pivoted at 17 to the frame 1 and their intermediate or rear portions connected to a windlass 18 by chains 19 winding on the windlass, each windlass 18 being provided with suitable operating means as a lever 20 for operating a ratchet wheel 21 associated with the windlass 18. Any other suitable means, however, may be employed for raising and lowering the plows 13, 14 and any other form of plow or any other implements may be employed.

The motor 22 may be of any desirable form, size and construction and is here shown as an internal combustion engine. Said motor 22 is supported in any suitable manner as by brackets 23 rising from the frame or beam 1. In the illustrated form of this machine the power-transmitting connections operated by the motor 22 for actuating the tractors 2, 3, comprise divisions between the motor and the tractors 2, 3; and each division is controllable independently of the other and comprises a gear 24 mounted on an extension 25 of the spindle 11, a gear 26 associated with the tractor 2 or 3 concentric therewith and meshing with the gear 24, and a driving member for each gear 24. The driving member for each gear 24 is here shown as a bevel gear 27 mounted on a shaft section 28 extending lengthwise of the frame 1 and connected to the motor as hereinafter described, there being one shaft section 28 for each gear 27. Each gear 27 meshes with a gear 29 fixed to the gear 24. As seen in Fig. 10 the gears 24 and 29 are cast integral with a hollow body mounted on a sleeve 30 encircling the spindle 25. Each shaft section 28, on which a gear 27 is mounted, is journaled at its outer end in a bearing 31 supported by an overhanging bracket 32 carried at each end of the frame or beam 1, each bracket also having a depending vertical bearing 33 in which the upper end of the adjacent spindle 25 is journaled. As each shaft section 28 is turned, the motion is transmitted to the tractor 2 or 3, and in the normal operation of the machine, that is, when the machine is traveling in a straight line in the field, both tractors 2, 3 are held from movement about the spindle 11 by any suitable holding means to be described, coacting with an arm 34 projecting from each axle support 9.

When furrow turning elements are attached to the frame, the advance tractor runs in the last furrow turned during the preceding trip of the machine across the field, and the rear tractor runs in the last furrow being turned, and the furrows guide the machine in its travel across the field. In fact the machine will travel in the furrows with no guiding means or operator. In this respect, my machine differs radically from other motor driven agricultural machines which must be steered at all times. The shaft sections 28 may both be connected to the motor so that both tractors receive power when the machine is traveling in a straight line, or either section may be disconnected from the motor upon the release of the arm 34 from the holding means for the purpose of swinging the tractor 2 or 3 about its spindle 11 in the direction indicated by the arrows $a$ Figs. 1 and 5, or from the position shown in full lines to that shown in dotted lines in Fig. 8. The direction of either shaft 28 may be reversed for moving the tractor from the position shown in dotted lines in Fig. 9 to that shown in full lines.

In the illustrated embodiment of my invention, each shaft section 28 is provided with a shiftable clutch section 35 slidable into and out of engagement with a clutch section 36 carried by a driving shaft 37 axially alined with the shafts 28 and journaled in suitable bearings 38 carried by the frame 1, the driving shaft 37 having a gear 39 thereon, which meshes with a double width driving gear 40, Figs. 2 and 5, mounted on a shaft 41 journaled and shiftable axially in bearings 42, said driving shaft also having beveled gears 43 mounted thereon which mesh with a driving bevel gear 44, Fig. 5. The shaft 41 is shiftable axially for carrying either beveled gear 43 out of mesh, and the other into mesh, with the driving gear 44. Said gear 44 is mounted on a shaft 46 which is connected by any well known clutch mechanism to the crank shaft of the engine 22. The shaft 37 is hollow and the shaft sections 28 extend into and are journaled at their inner ends therein. Obviously by shifting either one or the other of the clutch sections 35 out of engagement with its companion section 36, the shaft 28 connected to the other clutch section 35 will be actuated by the engine, and if it is desired to reverse the direction of rotation of either or both sections 28, the shaft 41 is slidable axially to carry one of the beveled gears 43 out of engagement with the driving gear 44 and the other gear 43 into mesh with such driving gear 44.

The clutch sections 35 are shifted by means for operating the holding means coacting with the arms 34; and the shaft 41 is shiftable axially by means of a rock shaft 47, Figs. 2 and 4, connected by a link 48 to said shaft 41, the shaft 47 having a handle 49 located within reach of the seat 50 of the machine. The holding means coacting with the arm 34 of each axle support comprises a pair of latches 51 and a latch 52, the latches 51 and 52 being movable vertically through a support 53 adjustable in an arc concentric with the corresponding axle support, along a bracket 54 projecting laterally from the beam 1, each support 53 being held in its adjusted position by set screws 55, Fig. 12. The latches 51 of one holding means coact with the arm 34 of the axle support 9 for the advance tractor 2, while the latch 52 of the other holding means coacts with the arm 34 associated with the rear tractor, Figs. 4 and 5. These latches 51 and 52 are shown as provided respectively with cam or inclined faces 56, 57 at their lower ends, Fig. 12, for permitting the arms 34 to latch into operative engagement therewith, that is, move into position between the latches 51 or to the inside of the latch 52. Said latches 51, 52 of each set are spaced any suitable distance apart depending on the normal incline of the beam 1, relatively to the line of travel which incline is dependent on the number of plows or other implements in a gang.

The means for operating the latches 51, 52 of each holding means, as here shown, comprises a member or cam 58 for moving the latches endwise out of the path of the companion arm 34 when said arm 34 is engaged between the latches 51 or between the latch 52 and the opposing surface of the frame, said cam being pivoted at 59 between its ends to one of the brackets 54 and having inclined surfaces 60 and 61 on opposite sides of its pivot for passing under the heads 62, 63 of the latches 51, 52 respectively, and raising or withdrawing the latches out of the path of the arm 34. The latches are returned by their own weight to their operative position. As each cam 58 is pivoted between its ends, the cam surface 60 at one end moves the latch 51 out of operative position while the surface 61 at its other end permits the latch 52 to assume its operative position. Said cams 58 are reversely arranged, Figs. 4 and 5, and are connected by a lengthwise link 64 so that when one cam is operated the other will also be operated.

The link 64 is operated by means of a hand lever 65 Fig. 4, located near the seat 50, the lever 65 being connected to one arm of a bell crank 66 pivoted at 67 to the upper face of the main frame or beam 1, the other arm of the bell crank 66 being provided with a slot 68 coacting with a pin 69 provided on the rod or link 64. Obviously during the movement of the lever 65 one of the cams 58 will be operated to move the end thereof supporting the cam surface 60 to withdraw the latches 51 of the corresponding holding means, and the other cam 58, Fig. 4, will be operated to engage its surface 61 with the head of the latches 52 of the other holding means to withdraw the latches 52.

During continued rotation of the shaft 28 connected to the advance tractor 2 after the arm 34 associated with the advance tractor has been released from its holding means or latches, the tractor 2 will be moved about its axis or spindle 11 in the direction of the arrow $a$, Fig. 5, into the position shown in dotted lines, Figs. 1 and 8, thereby swinging the beam or frame 1 about the spindle 11 at the other or rear end of the frame 1 causing the frame to carry the rear bracket 54, Fig. 4, so that the arm 34 of the rear tractor 3 will be engaged with the latches 51.

The link or rod 64 is provided with means for shifting either one of the clutch sections 35 out of operative position, such means consisting of a pivoted push arm 70 Fig. 7 for each shifting lever 71, said levers having eyes 72 encircling the rod or link 64. Each lever 71 is pivoted at 73 between its ends and its other end is forked and extends into a groove 74 in one of the clutch sections 35. The operation of the shifting levers 71 is against the action of returning springs 75. As there are two clutch sections, there is a lever 71 for each clutch section and a push arm 70 for each of said levers 71, the push arms being arranged on opposite sides of the levers 71, so that when one push arm 70 is moving toward its companion lever 71 the other push arm 70 is moving away from the other lever 71. Thus only one arm 70 and lever 71 will engage. Therefore, when the lever 65 is operated to move the cams 58 in the manner above described, the rear tractor 3 is disengaged from the engine and the advance tractor 2 remains connected to the engine in order that when the arm 34 connected to the advance tractor 2 is released from the latches of its companion holding means, the power of the shaft 28 will be transmitted thereto to turn the same about its spindle 11 in the direction of the arrow $a$ Fig. 5. The levers 70 have their tails weighted so that their engaging ends are normally in position to engage the levers 71.

As seen in Fig. 7, the push arms 70 are moved out of operative position by any suitable means as knock-off devices and means for operating said devices. The knock-off devices here shown consist of angular levers 76, pivoted at their angles to the frame 1, each having one arm movable into engagement with the weighted end of one of the push arms 70 for moving said push arm out of operative position and each lever 76 having its other arm connected to a link 77. The link 77 is moved endwise by a pedal 78 suitably connected thereto. The turning movement of each tractor 2 or 3 about its spindle 11, is limited by suitable means as a stop arm 79 projecting from the corresponding axle support 9 in a direction opposite to that of the arm 34, the arm 79 engaging the end of the beam or frame 1. When the turning movement of the advance tractor is limited by the engagement of the arm 79 with the beam of frame 1 and the power continues to be transferred through the shaft 28 and gears 27, 29, 24 and 26, the advance tractor will shift the advance end of the beam laterally as indicated by the arrow $b$, Fig. 1, about the pivotal axis 11 of the rear axle support, and during such movement the arm 34 of the axle support of the rear tractor 2, becomes disengaged from the corresponding latch 52, as such latch 52 is withdrawn out of operative position, and engages with the latches 51. The clicking of the latches 51 into engagement with the arm 34 of the rear axle support, informs the operator when the advance end of the beam has been swung laterally far enough to bring the plow bodies 13 or 14 in position to turn the next furrows, it being understood that during the advance movement in one direction one gang is employed, and during the movement of the machine in another direction, another gang is employed.

After the advance end of the beam or frame 1 has been shifted laterally, the shaft 41 may be shifted to an intermediate position so that the driving pinion 44 is in neutral position or the clutch of the engine 22 moved out of operative position, and the handle 49 is operated to shift the gear carrying shaft 41 to reverse the direction of rotation of the shaft sections 28, thus causing the machine to advance in the opposite direction crosswise of the field, the rear tractor 3 in the previous operation of the machine now becoming the advance tractor. Usually, however, the shaft 41 is shifted to carry the pinion 45 out of mesh with one gear 43 directly into mesh with the other, and at the same time, the clutch section 34 previously shifted out of operative position is shifted back into operative position by its spring 75, upon the operation of the pedal 78.

During the advance movement in a retrograde direction across the field, the rear tractor 2, which has been previously referred to as the advance tractor, is driven in the reverse direction and hence moves from its position shown in Fig. 9 in dotted lines to that shown in full lines or in the direction of the arrow $c$, Fig. 1, the latches 51 of the companion holding means being held out of operative position by the corresponding cam 58 so that the arm 34 swings into engagement with the latch 52, pushing the latch 52 upwardly as it passes the same by engaging the cam surface 57 thereof. After the first trip across the field, the advance tractor moves in the furrow nearest the plowed land, that is, the last furrow formed during the previous trip of the machine across the field, while the rear tractor is traveling in the last furrow being turned, that is, the furrow next to the unplowed land. If, for any reason during the lateral shifting of the beam 1 the tractor should be driven too far laterally it becomes necessary to swing the beam in the opposite direction by reversing the power and preventing the return of said tractor to its normal position and means is provided for engaging and holding the stop arm 79, such means consisting of a latch 80 for each arm 79, the latches 80 being moved into and out of operative position by means of a lever 81, Fig. 7, pivoted between its ends at 82 and having the arms thereof connected to the latches 80 respectively by links 83.

In operation one gang of plows 13 or 14 is lowered by operating one windlass 18 and the engine started, both clutch sections 35 being in operative position, the machine then progresses across the field until it reaches the other side thereof when the arm 34 associated with the advance tractor 2 is released and the clutch section 35 on the shaft section 28 connected to the rear tractor 3 moved out of operative position, by operating the lever 65, whereupon such advance tractor 2 swings about the axis of its spindle 11 and carries the advance end of the frame or beam 1 laterally so that the other gang of plows is in position to turn the next furrows, whereupon the first gang is raised and the second gang lowered. The reversing gear is then operated by means of the handle 49 and the lever 71 of the clutch section 35 released out of operative position by pushing the foot lever 78. These operations are repeated until the desired amount of land is plowed.

As seen in Fig. 4, this machine is provided with suitable means for steering the same when it is being driven to and from the field, such means being here shown as a non-rotatable axially movable worm 84, a rotatable nut 85 coacting with the worm and held from axial movement therewith, and means for rotating the nut. The worm 84 and nut 85 are supported in a suitable bracket 86, and the worm is connected to the adjacent arm 34 by means of a link 87 pivoted to one end of said worm, and the link is detachably coupled to said arm 34 by a pin or bolt 88. The means for rotating the nut 85 comprises a hand wheel 89 located within reach of the seat 50, sprocket wheels or pulleys 90, 91 mounted respectively on the shaft on which the hand wheel 89 is mounted and on the nut 85, and a sprocket chain or belt 92 running over said wheels 90, 91. In the normal use of the machine the steering mechanism is detached by withdrawing the pin or bolt 88. When the steering mechanism is coupled to the arm 34 the cams 58 are operated to withdraw the corresponding latches 51 out of engagement with the arm 34 to which the steering means is coupled. If greater freedom of movement of the steering wheel is necessary than that provided for by the displacement of the stops 51 by the cam 58, the stop 52 may be removed by lifting the same out of its position so that the arm 34 can be swung in either direction a maximum distance by the steering gear. As in the normal use of the plow, the caster wheel runs on the land and is therefore higher than the tractors 2, 3 which run in furrows, it is desirable to maintain the frame level when running to and from the field. Therefore means is provided for raising and lowering the frame relatively to the caster wheel 4, such means comprising a sleeve 93 which can be inserted either above or below the bearing 6 of the frame member 7 upon the removal of the nut 94 on the upper end of the spindle 95, of the supporting bracket 5 for the wheel 4.

What I claim is:

1. In an agricultural machine, a frame, front and rear tractors, the frame and the tractors being connected by vertical pivots, farming implements supported by the frame, a motor carried by the frame, means operated by the motor for driving and for shifting the tractors about their pivots and causing the tractor at either end of the frame to move laterally and hence move the frame about the pivot at the other end thereof and means for normally holding the tractors from turning on their pivots, substantially as and for the purpose specified.

2. In an agricultural machine, a frame, tractors supporting the frame and pivotally connected thereto, farming implements supported by the frame, a motor carried by the frame, power-transmitting means operated by the motor for actuating the tractors alternately and turning the same on their pivots at an angle to the normal line of travel of the machine to swing one end of the machine laterally relatively to the other end, means for controlling the operation of the power-transmitting means and means for normally holding the tractors parallel to the line of draft, substantially as and for the purpose set forth.

3. In a self propelled agricultural machine, a frame, tractors supporting the frame, a motor, and power-transmitting connections operated by the motor for driving the tractors and for changing the angle of the same to swing either end of the frame laterally relatively to the other end, and means for normally holding the tractors in a straight line and preventing changing of the angle thereof by said power transmitting connections, substantially as and for the purpose described.

4. In a self propelled agricultural machine, a frame, tractors supporting the frame and pivotally connected thereto near opposite ends of the frame, the axes of such pivotal connections extending substantially vertically, farming implements carried by the frame, a motor, power-transmitting connections operated by the motor for driving the tractors and for swinging either end of the frame about the axis near the other end thereof, said connections being constructed to normally move the tractors about the vertical pivotal axes of the frame in a forward direction and hence move the frame about the pivotal axis of the other end thereof, and means for normally preventing movement of the tractors about the vertical axes by the power-transmitting means, substantially as and for the purpose described.

5. In a self propelled agricultural machine, a frame, furrow turning elements carried by the frame, advance and rear tractors supporting the frame and being pivotally connected thereto near opposite ends of the frame and arranged to travel on opposite sides of a line parallel to the line of draft so that the advance tractor normally travels in the last furrow turned during the preceding trip of the machine and the rear tractor travels in one of the furrows being turned, the axes of the pivotal connections extending substantially vertical, farming implements carried by the frame, a motor, and power-transmitting means operated by the motor for swinging either end of the frame about the axis near the other end thereof, substantially as and for the purpose specified.

6. In a self propelled agricultural machine, a frame movable about axes spaced apart, tractors supporting the frame, farming implements supported by the frame, a motor carried by the frame, power-transmitting connections operated by the motor for actuating the tractors and for also moving the frame about either of said axes, means for normally preventing the shifting of the frame by the power-transmitting means and means for controlling the operation of the power-transmitting means, and the preventing means substantially as and for the purpose set forth.

7. In an agricultural machine, a frame, tractors supporting the frame and located near opposite ends thereof, the frame and the tractors being connected by substantially vertical pivots, a motor supported by the frame, power transmitting connections operated by the motor for driving the tractors about the axes of their axles, and swinging the tractors about their vertical pivots, means for normally preventing and for limiting the swinging of the tractors about their vertical pivots to approximately an arc of 90°, and means for controlling the operation of the power transmitting connections and the preventing means, substantially as and for the purpose described.

8. In an agricultural machine, a frame, wheels for supporting the frame including a tractor, the frame and the tractor being pivotally connected and the pivotal axis extending substantially vertically, a motor supported by the frame, power-transmitting connections operated by the motor for driving the tractor in its normal operation and for moving the tractor about its upright pivotal axis and thereby shifting the frame, means for normally preventing the movement of the tractor about its axis by said power transmitting means, means for limiting said pivotal movement, and means for controlling the operations of the power-transmitting connections and the preventing means, substantially as and for the purpose set forth.

9. In a self propelled agricultural machine, a frame, tractors for supporting the frame, the frame and the tractors being pivotally connected, and the pivotal axes extending substantially vertically, farming implements supported by the frame, a motor supported by the frame, power-transmitting connections operated by the motor and connected to the tractors to rotate the tractors about their axes in their normal operation and to shift the tractor at either end of the frame about its upright pivotal axis and thereby shifting one end of the frame about the axis of the pivotal connection at the other end of the frame, means for normally preventing movement of the tractors about their upright pivotal axes and means for controlling the operations of said power-transmitting connections, substantially as and for the purpose described.

10. In a self propelled agricultural machine, a frame, tractors for supporting the frame, the frame and the tractors being pivotally connected, and the pivotal axes extending substantially vertically, farming implements supported by the frame, a motor supported by the frame, power-transmitting connections operated by the motor for actuating the tractors in their normal operation and for moving a tractor at one end of the frame about its upright pivotal axis and thereby shifting one end of the frame about the axis of the pivotal connection at the other end of the frame, means for limiting the pivotal movement of the tractors about their upright axes, means for normally preventing movement of the tractors about their upright axes, and means for controlling the operations of said power-transmitting means and the preventing means, substantially as and for the purpose described.

11. In an agricultural machine, a frame formed with an upright bearing, wheels supporting the frame including a tractor, an axle upon which the tractor is mounted, an axle support movable in the upright bearing, a motor carried by the frame, power-transmitting connections operated by the motor for driving the tractor about the axis of its axle, said connections being constructed to rotate the upright axle supports in their bearings, means for normally preventing such rotation, means for operating the preventing means, and means for controlling the operations of said connections, substantially as and for the purpose set forth.

12. In a self propelled agricultural machine, a frame formed with upright bearings spaced apart, tractors for supporting the frame, axles upon which the tractors are mounted, axle supports engaging respectively with the bearings, farming implements supported by the frame, a motor carried by the frame, power-transmitting connections operated by the motor arranged to rotate the tractors about the axes of their axles and to swing the upright axle supports relatively to their bearings, means for normally preventing actuation of the tractors about the axes of their bearings, means for operating the preventing means and operating means for controlling the operations of said connections, substantially as and for the purpose specified.

13. In a self propelled agricultural machine, a frame formed with upright bearings spaced apart, furrow turning elements carried by the frame, front and rear tractors for supporting the frame and arranged to travel on opposite sides of a line parallel to the line of draft so that the front tractor normally travels in one of the furrows turned during the preceding trip of the machine, and the rear tractor travels in the last furrow being turned, axles on which the tractors are mounted, axle supports engaging respectively with the bearings, a motor carried by the frame, power-transmitting connections operated by the motor for actuating the tractors about the axes of their axles and for moving the upright axle supports relatively to their bearings, and operating means for controlling the operations of said connections, substantially as and for the purpose set forth.

14. In a self propelled agricultural machine, a frame comprising a beam, the beam being provided with upright bearings near its opposite ends, tractors for supporting the beam, axles upon which the tractors are mounted, axle supports engaging respectively with the bearings, farming implements supported by the beam, a motor carried by the beam, power-transmitting connections operated by the motor and connected to the tractors to rotate the tractors about the axes of their axles and to swing the upright axle supports relatively to their bearings, means for normally preventing turning of the tractors about their upright axes, means for operating the preventing means, and means carried by the beam for controlling the operations of said connections, substantially as and for the purpose specified.

15. In a self propelled agricultural machine, a frame, front and rear tractors for supporting the frame, the tractors being spaced apart, the frame and the tractors being pivotally connected and the axes of such connections extending substantially vertically, farming implements supported by the frame, a motor carried by the frame, power-transmitting connections operated by the motor and connected to the tractors to rotate the tractors in their normal operation, and to swing the tractor at either end of the frame about its vertical axis and thereby shift one end of the frame about the axis of its pivotal connection at the other end of the frame, means for normally holding the tractors and frame from movement about the pivotal axes connecting the same, means for limiting the movement of the tractors about their upright axes, and means for controlling the operation of the power-transmitting connections and the holding means, substantially as and for the purpose specified.

16. In a self propelled agricultural machine, a frame, front and rear tractors, furrow turning elements supported by the frame, the frame and the tractors being pivotally connected, and the axes of such connections extending substantially vertically and the front tractor traveling in the last furrow turned during the preceding trip of the machine, and the rear tractor traveling in the last furrow being turned, a motor carried by the frame, power-transmitting connections operated by the motor for actuating the tractors in their normal operation and for moving the same about their pivotal axes and shifting either end of the frame about the vertical axis of the pivotal connection at the other end of the frame, means for normally holding the tractors and frame from movement about the pivotal axes connecting the same, and means for controlling the operation of the power-transmitting connections and the holding means, substantially as and for the purpose set forth.

17. In a self propelled agricultural machine, a frame formed with upright bearings spaced apart, tractors for supporting the frame, axles upon which the tractors are mounted, axle supports engaging respectively with the bearings, farming implements supported by the frame, a motor carried by the frame, mechanical power-transmitting connections operated by the motor for actuating the tractors about the axes of their axles, and for moving the axle supports relatively to their bearings, means for normally locking the axle supports and the frame from relative movement, and mechanical means for controlling the operation of the power-transmitting connections and the locking means, substantially as and for the purpose described.

18. In a self propelled agricultural machine, a frame, tractors for supporting the frame, the tractors being movable about upright axes relatively to the frame, farming implements supported by the frame, a motor carried by the frame, mechanical power-transmitting connections operated by the motor for actuating the tractors, said connections including means for connecting or disconnecting either tractor from the motor and for turning either tractor at an angle to the normal line of draft and actuating the tractor after being turned, releasable means normally holding the tractors from turning about their upright axes by said connections when being rotated thereby, and means for limiting the turning of such tractor, substantially as and for the purpose specified.

19. In a self propelled agricultural machine, a frame formed with an upright bearing, wheels supporting the frame and including a tractor, an axle upon which the tractor is mounted, an axle support journaled in the upright bearing, a motor carried by the frame, power-transmitting means for rotating the tractor about the axis of its axle and for actuating the axle support in its bearing, said means including a driving gear loosely mounted concentric with the axle support, and a gear associated with the tractor concentric to the axle thereof and meshing with the former gear, the former gear being of less diameter than the latter, driving means connected to the former gear, means for normally holding the axle support from turning, and operating means for controlling the operations of the power-transmitting means and the holding means, substantially as and for the purpose specified.

20. In a self propelled agricultural machine, a frame formed with upright bearings, spaced apart, tractors supporting the frame, axles upon which the tractors are mounted, axle supports engaging respectively with the upright bearings, farming implements carried by the frame, a motor carried by the frame, power-transmitting connections for actuating the tractors about the axes of their axles and for also actuating the axle supports, said means comprising gears loosely mounted concentric with the axes of the axle supports, gears associated with the tractors concentric with the axles for the tractors and meshing with the former gears, driving means for the first-mentioned gears, means for normally holding the axle supports from turning, and operating means for controlling the operation of said power-transmitting connections and the holding means, substantially as and for the purpose set forth.

21. In a self propelled agricultural machine, a frame, tractors spaced apart in a direction lengthwise of the frame, the frame and the tractors being pivotally connected and the pivotal axes extending substantially vertically, farming implements supported by the frame, a motor supported by the frame, power-transmitting connections operated by the motor and including members, each being connected to one of the tractors for actuating the same in its normal operation, and for moving said tractor about its vertical axis and thereby shifting one end of the frame about the axis of the pivotal connection at the other end of the frame, means for normally preventing turning of the tractors about their vertical axes, means for limiting the turning movement of the tractors about their vertical axes, and operating means for connecting both members to the motor or for disconnecting either of said members from the motor, substantially as and for the purpose described.

22. In a self propelled agricultural machine, a frame, tractors spaced apart, the frame and the tractors being pivotally connected, and the pivotal axes extending substantially vertically, farming implements supported by the frame, a motor supported by the frame, power-transmitting connections operated by the motor and including members, each being connected to one of the tractors for actuating the same in its normal operation, and for moving said tractor about its vertical axis and thereby shifting one end of the frame about the axis of the vertical connection at the other end of the frame, operating means for connecting both members to the motor, or for disconnecting either member from the motor, and means for reversing the direction of movement of the members, substantially as and for the purpose specified.

23. In a self propelled agricultural machine, a frame, tractors for supporting the frame, the tractors being spaced apart and movable about upright axes relatively to the frame, farming implements supported by the frame, a motor carried by the frame, power-transmitting connections operated by the motor for actuating the tractors, said connections including divisions connected respectively to the tractors, and means for connecting or disconnecting either division and the motor, and means for reversing the direction of movement of either division, each division including means for turning one of the tractors about its upright axis, means for normally holding the tractors from turning about their upright axes, means for limiting such turning movement, and means for operating the holding means, substantially as and for the purpose set forth.

24. In a self propelled agricultural machine, a frame formed with upright bearings spaced apart, tractors supporting the frame, axles on which the tractors are mounted, axle supports engaging with the bearings respectively, farming implements supported by the frame, a motor carried by the frame, power-transmitting connections between the motor and the tractor comprising gears loosely mounted concentric with the axis of the axle supports, gears associated respectively with the tractors concentric with the axles thereof and meshing with the former gears, driving members coacting with the first-mentioned gears, means operable to drive said members in the same direction, means operable to disconnect either of said members from the motor, means operable to reverse the direction of movement of said members, means for normally holding the axle supports from movement about their axes, means for releasing such holding means, and means for limiting the turning movement of the axle supports, substantially as and for the purpose described.

25. In a self propelled agricultural machine, a frame comprising a beam extending lengthwise of the machine and normally inclined with respect to the line of travel to the machine, the frame being provided with upright bearings near its opposite ends, tractors supporting the opposite ends of the beam, axles on which the tractors are mounted, axle supports engaging with the bearings respectively, farming implements supported by the beam, a motor carried by the beam, power-transmitting connections including parts carried by the beam and extending lengthwise thereof, said connections comprising gears loosely mounted concentric with the axes of the axle supports, gears associated respectively with the tractors and meshing with the former gears, driving members coacting with the first-mentioned gears, shafts extending lengthwise of the beam for operating said members, means for controlling the operation of the shafts, said means being operable to effect the driving of the shafts in the same direction, means operable to disconnect either of said shafts from the motor, means operable to reverse the direction of movement of said shafts, means for normally holding the axle supports from movement about their axes, means for releasing the holding means, and means for limiting the turning of the axle supports, substantially as and for the purpose specified.

26. In a self propelled agricultural machine, a frame, tractors spaced apart, the frame and tractors being pivotally connected and the pivotal axes thereof extending substantially vertically, farming implements supported by the frame, a motor supported by the frame, power-transmitting connections operated by the motor for actuating the tractors in their normal operation, and for moving the tractor at either end of the frame about its upright pivotal axis and thereby shifting one end of the frame about the axis of the pivotal connection at the other end of the frame, means for limiting the movement of the tractors about their upright axes, and manually operated means for preventing the return of the tractors to their normal position, substantially as and for the purpose set forth.

27. In a self propelled agricultural machine, a frame, tractors for supporting the frame, the tractors being spaced apart and being movable about upright axes relatively to the frame, farming implements supported by the frame, a motor carried by the frame, power-transmitting connections operated by the motor for actuating the tractors, said connections including means for connecting or disconnecting either tractor from the motor, and for turning either tractor at an angle to the line of draft and actuating the tractor when so turned at an angle to the line of draft, means for limiting the turning of such tractor, and means for preventing the return of the tractor to its position parallel to the line of draft, substantially as and for the purpose described.

28. In a self propelled agricultural machine, a frame formed with upright bearings spaced apart, tractors supporting the frame, axles upon which the tractors are mounted, axle supports engaging respectively with the upright bearings, farming implements carried by the frame, a motor carried by the frame, power-transmitting connections for actuating the tractors about the axes of their axles and for also actuating the axle supports, said means comprising gears loosely mounted concentric with the axes of the axle supports, gears associated with the tractors and meshing with the former gears, driving means for the first-mentioned gears, means for normally holding the axle supports from turning, means for limiting the turning movement of the axle supports, means for preventing the return of the axle supports to their normal position, and operating means for controlling the operation of said power-transmitting connections and the holding means, substantially as and for the purpose specified.

29. In a self propelled agricultural machine, a frame, tractors for supporting the frame, the frame and the tractors being pivotally connected and the axes of such connections extending substantially vertically, farming implements supported by the frame, a motor supported by the frame, power-transmitting connections operated by the motor for actuating the tractors in their normal operation, and for moving the tractor at either end of the frame about its vertical axis and shifting one end of the frame about the axis of the pivotal connection at the other end of the frame, means for normally holding the tractors and the frame from movement about the pivotal axes including locking members for each tractor, arranged eccentric to such axes, parts for operating said members, the operating parts being arranged reversely with respect to each other and being connected so that the movement of one part is transmitted to the other, and means for controlling the operation of the power-transmitting connections and for operating said parts, substantially as and for the purpose set forth.

30. In a self propelled agricultural machine, a frame formed with upright bearings, spaced apart in a direction lengthwise thereof, tractors for supporting the frame, axles upon which the tractors are mounted, axle supports engaging respectively with the bearings, farming implements supported by the frame, power-transmitting connections operated by the motor for actuating the tractors about the axes of their axles and for moving the axle supports relatively to their bearings, the axle supports having radially extending arms, latches supported by the frame and normally coacting with said arms, for holding the axle supports from turning, members for operating the latches, said members being arranged in reverse position with respect to each other and being connected together, and means for controlling the operation of the power-transmitting connections and the latches, substantially as and for the purpose described.

31. In a self propelled agricultural machine, a frame formed with upright bearings spaced apart, tractors for supporting the frame, axles upon which the tractors are mounted, axle supports engaging respectively with the bearings, farming implements supported by the frame, power-transmitting connections operated by the motor for actuating the tractors about the axes of their axles and moving the axle supports relatively to their bearings, the axle supports having substantially radially extending arms, means for normally locking the axle supports from movement comprising latches carried by the frame for coacting with the radially extending arms of the axle supports, and each locking means including two sets of latches for each arm for holding said arm in different positions, members for operating said parts, said members being reversely arranged and being connected together and each member being positioned to operate the latches of each set alternately, and operating means for controlling the operation of the power-transmitting connections and said members, substantially as and for the purpose specified.

32. In a self propelled agricultural machine, a frame formed with upright bearings spaced apart, tractors supporting the frame, axles upon which the tractors are mounted, axle supports engaging respectively with the upright bearings, farming implements carried by the frame, a motor carried by the frame, power-transmitting means for actuating the tractors about the axes of their axles for also actuating the axle supports, said means comprising gears loosely mounted concentric with the axes of the axle supports, gears associated with the tractors concentric with the axles for the tractors and meshing with the former gears, driving means for the first-mentioned gears, the axle supports being formed with substantially radially extending arms, means for normally locking the axle supports from movement comprising latches carried by the frame for coacting with the radially extending arms of the axle supports, and each locking means including two sets of latches for each arm for holding said arm in different positions, members for operating the said parts, said members being reversely arranged and being connected together and each member being positioned to operate the latches of each set alternately, and operating means for controlling the operation of said power-transmitting connections and said members, substantially as and for the purpose set forth.

In testimony whereof, I have hereunto signed my name in the presence of two attesting witnesses, at Syracuse, in the county of Onondaga, in the State of New York, this 5 day of Sep. 1911.

ALEXANDER T. BROWN.

Witnesses:
CHARLES E. TOMLINSON,
S. DAVIS.